United States Patent
Alexiou et al.

(10) Patent No.: US 10,525,424 B2
(45) Date of Patent: Jan. 7, 2020

(54) ZWITTERIONIC COPOLYMERS FOR FOULING RESISTANT FILTRATION MEMBRANES

(71) Applicant: Trustees of Tufts College, Medford, MA (US)

(72) Inventors: Ayse Asatekin Alexiou, Arlington, MA (US); Papatya Kaner, Cambridge, MA (US); Chiara Vannucci, Medford, MA (US)

(73) Assignee: Trustees of Tufts College, Medford, MA (US)

( * ) Notice: Subject to any disclaimer, the term of this patent is extended or adjusted under 35 U.S.C. 154(b) by 0 days.

(21) Appl. No.: 15/541,260

(22) PCT Filed: Dec. 30, 2015

(86) PCT No.: PCT/US2015/067991
§ 371 (c)(1),
(2) Date: Jun. 30, 2017

(87) PCT Pub. No.: WO2016/109621
PCT Pub. Date: Jul. 7, 2016

(65) Prior Publication Data
US 2018/0001278 A1    Jan. 4, 2018

Related U.S. Application Data

(60) Provisional application No. 62/098,195, filed on Dec. 30, 2014.

(51) Int. Cl.
*B01D 71/78* (2006.01)
*C08F 265/06* (2006.01)
*C08L 51/06* (2006.01)
*B01D 71/82* (2006.01)
*B01D 71/76* (2006.01)
*C08F 297/02* (2006.01)
*B01D 71/34* (2006.01)
*B01D 71/40* (2006.01)

(52) U.S. Cl.
CPC ............. *B01D 71/78* (2013.01); *B01D 71/76* (2013.01); *B01D 71/82* (2013.01); *C08F 265/06* (2013.01); *C08F 297/02* (2013.01); *C08L 51/06* (2013.01); *B01D 71/34* (2013.01); *B01D 71/40* (2013.01); *B01D 2325/18* (2013.01)

(58) Field of Classification Search
CPC .............................. B01D 71/78; C08F 265/06
See application file for complete search history.

(56) References Cited

PUBLICATIONS

Ishihara (Journal or Biomedical Materials Research, 28 (1994) 225-232).*
Chiang, et al., "Sulfobetaine-grafted poly(vinylidene fluoride) ultrafiltration membranes exhibit excellent antifouling property", Journal of Membrane Science 339 (2009) 151-159.
Su, et al., "Modification of polyethersulfone ultrafiltration membranes with phosphorylcholine copolymer can remarkably improve the antifouling and permeation properties", Journal of Membrane Science 322 (2008) 171-177.
Sun, et al., "Improved antifouling property of zwitterionic ultrafiltration membrane composed of acrylonitrile and sulfobetaine copolymer", Journal of Membrane Science 285 (2006) 299-305.
Wang, et al., "Antifouling ultrafiltration membrane composed of polyethersulfone and sulfobetaine copolymer", Journal of Membrane Science 280 (2006) 343-350.
Yue, et al., "Grafting of zwitterion from polysulfone membrane via surface-initiated ATRP with enhanced antifouling property and biocompatibility", Journal of Membrane Science 446 (2013) 79-91.

* cited by examiner

*Primary Examiner* — Kuo Liang Peng
(74) *Attorney, Agent, or Firm* — Foley Hoag LLP

(57) ABSTRACT

A graft copolymer including zwitterionic repeat units and hydrophobic repeat units, in which the zwitterionic repeat units constitute 2-60 wt % of the graft copolymer and each of the hydrophobic repeat units is characterized in that a homopolymer formed thereof is miscible with polyvinylidene fluoride, polysulfone, poly ether sulfone, polyvinyl chloride, or polyacrylonitrile, each of the hydrophobic repeat units not being a repeat unit of polyvinylidene fluoride. Also disclosed is a filtration membrane containing such a graft copolymer or a statistical copolymer that includes the same composition of repeat units as the graft copolymer. Further disclosed are methods of preparing the graft copolymer and the filtration membrane.

27 Claims, No Drawings

ZWITTERIONIC COPOLYMERS FOR FOULING RESISTANT FILTRATION MEMBRANES

CROSS REFERENCE TO RELATED APPLICATIONS

This application is the National Stage of International Application No. PCT/US2015/067991, filed on Dec. 30, 2015, which claims the benefit of U.S. Provisional Application No. 62/098,195, filed on Dec. 30, 2014. The contents of both applications are hereby incorporated by reference in their entirety.

GOVERNMENT SUPPORT

This invention was made with government support under grant 1437772 awarded by the National Science Foundation. The government has certain rights in the invention.

BACKGROUND

Filtration membranes are useful for wastewater purification and separation. In particular, ultrafiltration membranes, which have pore sizes of 1-50 nm, are used in a wide range of applications, including food, beverage, dairy, and pharmaceutical industries. They can remove, among others, microorganisms, viruses, oil droplets, and macromolecular contaminants.

Yet, use of filtration membranes is still limited by two major obstacles: low flux and membrane fouling. Membranes with low flux result in low efficiency and high cost. On the other hand, membrane fouling, i.e., loss of permeability due to adsorption and adhesion of feed components, causes low productivity and high energy consumption.

There is a need to develop a new filtration membrane that is highly permeable and anti-fouling.

SUMMARY

This invention relates to a filtration membrane, which, unexpectedly, has both high water permeability and high fouling resistance.

In one aspect, the present invention is a filtration membrane that contains a base polymer and a zwitterion-containing copolymer. The base polymer is polyvinylidene fluoride, polysulfone, poly ether sulfone, polyvinyl chloride, or polyacrylonitrile. The zwitterion-containing copolymer, insoluble in water, contains zwitterionic repeat units and hydrophobic repeat units, in which the zwitterionic repeat units constitute 2-60% by weight of the copolymer and the hydrophobic repeat units are capable of forming a homopolymer that is miscible with the base polymer, each of the hydrophobic repeat units being different from a repeat unit of polyvinylidene fluoride.

The filtration membrane can be an ultrafiltration membrane or a microfiltration membrane. In one example, the zwitterion-containing copolymer constitutes less than 50 wt % of a mixture of the base polymer and the zwitterion-containing copolymer.

In another aspect, this invention is a method for preparing such a filtration membrane. The method includes the following steps: (i) providing a copolymer solution by dissolving a zwitterion-containing copolymer in a solvent, (ii) adding a base polymer to the copolymer solution, and (iii) forming a filtration membrane by non-solvent induced phase separation. The base polymer used in the method is polyvinylidene fluoride, polysulfone, poly ether sulfone, polyvinyl chloride, or polyacrylonitrile. A unique feature of the method is that the copolymer, insoluble in water, contains zwitterionic repeat units and hydrophobic repeat units, in which the zwitterionic repeat units constitute 2-60% by weight of the copolymer, and the hydrophobic repeat units are capable of forming a homopolymer that is miscible with the base polymer, each of the hydrophobic repeat units being different from a repeat unit of polyvinylidene fluoride.

The filtration membrane thus prepared can be an ultrafiltration membrane having a molecular weight cut-off of 1000 to 250,000 Dalton and effective pore sizes of 1 to 10 nm. It can also be a microfiltration membrane having effective pore sizes of 20 to 5000 nm.

A further aspect of this invention relates to a graft copolymer that can be used to prepare a filtration membrane. The graft copolymer includes a hydrophobic backbone, which contains more hydrophobic repeat units than zwitterionic repeat units, and a plurality of 2-50 repeat side chains, each of which contains more zwitterionic repeat units than hydrophobic repeat units. The zwitterionic repeat units constitute 2-60 wt % of the graft copolymer, and the hydrophobic repeat units are capable of forming a homopolymer that is miscible with polyvinylidene fluoride, polysulfone, poly ether sulfone, polyvinyl chloride, or polyacrylonitrile, each of the hydrophobic repeat units being different from a repeat unit of polyvinylidene fluoride.

Each of the zwitterionic repeat units can contain independently one or more of the following functional groups: sulfobetaine, carboxybetaine, phosphorylcholine, and pyridinium alkyl sulfonate. They can be formed independently from sulfobetaine methacrylate, sulfobetaine-2-vinyl pyridine, sulfobetaine-4-vinyl pyridine, phosphorylcholine methacrylate, carboxybetaine methacrylate, or sulfobetaine acrylamide.

Each of the hydrophobic repeat units, independently, can be [—O-Ph-C(CH$_3$)$_2$-Ph-O-Ph-SO$_2$-Ph-], [-Ph-SO$_2$-Ph-O-Ph-Ph-O—], [-Ph-SO$_2$-Ph-O-Ph-SO$_2$-Ph-O—], [-Ph-SO$_2$-Ph-O-Ph-O—], or a repeat unit formed from methyl methacrylate, N,N-dimethyl acrylamide, ethyl methacrylate, acetonyl methacrylate, trifluoroethyl methacrylate, acrylonitrile, vinyl pyridine, vinyl chloride, styrene, butyl acrylate, butyl methacrylate, cyclohexyl methacrylate, or propyl acrylate. The abbreviation "-Ph-" represents 1,4-disubstituted phenyl. In one example, the hydrophobic repeat units are each formed from methyl methacrylate.

A filtration membrane can be prepared using the above-described graft copolymer as follows. The graft copolymer is first dissolved in a solvent to provide a copolymer solution, a base polymer (i.e., polyvinylidene fluoride, polysulfone, poly ether sulfone, polyvinyl chloride, or polyacrylonitrile) is then added to the copolymer solution and, finally, followed by non-solvent induced phase separation to produce a filtration membrane.

Also within the scope of this invention is a method for preparing the graft copolymer by first providing a polymer backbone that contains hydrophobic repeat units and Cl- or Br-containing repeat units, and then grafting the polymer backbone with side chains via atom transfer radical polymerization.

The details of one or more embodiments of the invention are set forth in the description below. Other features, objects, and advantages of the invention will be apparent from the following detailed description of several embodiments, and also from the appending claims.

DETAILED DESCRIPTION

Disclosed in detail herein is a graft copolymer including a hydrophobic backbone, which contains more hydrophobic repeat units than zwitterionic repeat units, and a plurality of 2-50 repeat side chains, each of which contains more zwitterionic repeat units than hydrophobic repeat units. Importantly, the zwitterionic repeat units constitute 2-60% (e.g., 5-45% and 10-30%) by weight of the graft copolymer, and the hydrophobic repeat units are capable of forming a homopolymer that is miscible with polyvinylidene fluoride, polysulfone, poly ether sulfone, polyvinyl chloride, or polyacrylonitrile, each of the hydrophobic repeat units being different from a repeat unit of polyvinylidene fluoride. The graft copolymer can have a molecular weight of 10,000 to 3,000,000 Dalton (e.g., 20,000 to 2,000,000 Dalton and 30,000 to 1,000,000 Dalton).

Zwitterionic moieties, each having an equal number of positive and negative charges, are highly resistant to protein adsorption. For example, the zwitterionic repeat units set forth above each contain independently sulfobetaine, carboxybetaine, phosphorylcholine, or pyridinium alkyl sulfonate.

An exemplary graft copolymer is poly((methyl methacrylate)-graft-(sulfobetaine-2-vinyl pyridine)), abbreviated as PMMA-g-SB2VP.

Two polymers are considered miscible herein if they show in a thermal analysis a glass transition temperature (Tg) between their separate Tg's in pure state after having been mixed together. For example, upon mixing polyvinylidene fluoride (PVDF), which has a Tg of about −40° C., and poly methyl methacrylate (PMMA), which has a Tg of about 100° C., if the Tg of PVDF rises to a temperature between −40° C. and 100° C. (e.g. −20° C.), it is an indication that PVDF is miscible with PMMA. The extent of the Tg shift depends on the composition of the mixture.

A method for preparing the graft copolymer includes (1) providing a polymer backbone, which contains hydrophobic repeat units and Cl- or Br-containing repeat units, and (2) grafting the polymer backbone with side chains via atom transfer radical polymerization. In this method, the polymer backbone thus formed typically includes more than 50 mol % of the hydrophobic repeat units and less than 20 mol % of the Cl- or Br-containing repeat units, and the side chains are each formed from a zwitterionic monomer.

Also disclosed in detail herein is a filtration membrane that includes a base polymer and a zwitterion-containing copolymer, in which the base polymer is polyvinylidene fluoride, polysulfone, poly ether sulfone, polyvinyl chloride, or polyacrylonitrile; and the zwitterion-containing copolymer contains zwitterionic repeat units and hydrophobic repeat units. Important features of the filtration membrane include that (i) the zwitterionic repeat units constitute 2-60% by weight of the copolymer, (ii) the hydrophobic repeat units are capable of forming a homopolymer that is miscible with the base polymer, each of the hydrophobic repeat units being different from a repeat unit of polyvinylidene fluoride, and (iii) the zwitterion-containing copolymer is insoluble in water.

A polymer is considered insoluble herein if its mass loss is less than 5% of its initial mass after having been stored in water for an extended period of time, e.g., more than 24 hours.

In one embodiment, the zwitterion-containing copolymer is a statistical copolymer and the base polymer is polyvinylidene fluoride, polysulfone, poly ether sulfone, or polyvinyl chloride. The statistical copolymer contains zwitterionic repeat units, each of which can be formed independently from sulfobetaine methacrylate, sulfobetaine-2-vinyl pyridine, sulfobetaine-4-vinyl pyridine, phosphorylcholine methacrylate, carboxybetaine methacrylate, or sulfobetaine acrylamide, and hydrophobic repeat units, each of which independently can be [—O-Ph-C(CH$_3$)$_2$-Ph-O-Ph-SO$_2$-Ph-], [-Ph-SO$_2$-Ph-O-Ph-Ph-O—], [-Ph-SO$_2$-Ph-O—P—SO$_2$-Ph-O—], [-Ph-SO$_2$-Ph-O-Ph-O—], or a repeat unit formed from methyl methacrylate, N,N-dimethyl acrylamide, ethyl methacrylate, acetonyl methacrylate, trifluoroethyl methacrylate, vinyl pyridine, vinyl chloride, styrene, butyl acrylate, butyl methacrylate, cyclohexyl methacrylate, or propyl acrylate. The zwitterionic repeat units constitute 5-45% (e.g., 10-30%) by weight of the statistical copolymer and the statistical copolymer has a molecular weight of 10,000 to 3,000,000 Dalton (e.g., 30,000 to 1,000,000 Dalton). Examples of the statistical copolymer include poly ((methyl methacrylate)-random-(sulfobetaine methacrylate)) (abbreviated as PMMA-r-SBMA) or poly((methyl methacrylate)-random-(sulfobetaine-2-vinyl pyridine)) (abbreviated as PMMA-r-SB2VP).

In another embodiment, the zwitterion-containing copolymer is a graft copolymer including a hydrophobic backbone, which contains more hydrophobic repeat units than zwitterionic repeat units, and a plurality of 2-50 repeat side chains, each of which contains more zwitterionic repeat units than hydrophobic repeat units. The zwitterionic repeat units each can be formed independently from sulfobetaine methacrylate, sulfobetaine-2-vinyl pyridine, sulfobetaine-4-vinyl pyridine, phosphorylcholine methacrylate, carboxybetaine methacrylate, or sulfobetaine acrylamide; and each of the hydrophobic repeat units, independently, can be [—O-Ph-C(CH$_3$)$_2$-Ph-O-Ph-SO$_2$-Ph-], [-Ph-SO$_2$-Ph-O-Ph-Ph-O—], [-Ph-SO$_2$-Ph-O-Ph-SO$_2$-Ph-O—], [-Ph-SO$_2$-Ph-O-Ph-O—], or a repeat unit formed from methyl methacrylate, N,N-dimethyl acrylamide, ethyl methacrylate, acetonyl methacrylate, trifluoroethyl methacrylate, acrylonitrile, vinyl pyridine, vinyl chloride, styrene, butyl acrylate, butyl methacrylate, cyclohexyl methacrylate, or propyl acrylate. The zwitterionic repeat units constitute 5-45% (e.g., 10-30%) by weight of the graft copolymer and the graft copolymer has a molecular weight of 10,000 to 3,000,000 Dalton (e.g., 30,000 to 1,000,000 Dalton). An example of the graft copolymer is PMMA-g-SB2VP.

It is critical that the hydrophobic segment of the copolymer is miscible with the base polymer, i.e., PVDF, polysulfone, poly ether sulfone, polyvinyl chloride, or polyacrylonitrile. When the copolymer and the base polymer are mixed, the Tg of the base polymer shifts toward the Tg of the hydrophobic segment of the copolymer, indicating that the hydrophobic segment of the copolymer is dispersed in the base polymer. If the Tg of the base polymer does not shift up upon mixing the copolymer and the base polymer, it is an indication that the hydrophobic segment of the copolymer is not dispersed in the base polymer and, as a result, the mixing does not improve the performance of the filtration membrane thus formed.

Further covered by this invention is a method of preparing a filtration membrane. The method includes providing a copolymer solution by dissolving a zwitterion-containing copolymer in a solvent, adding a base polymer to the copolymer solution, and forming a filtration membrane by non-solvent induced phase separation. The base polymer used in this method is polyvinylidene fluoride, polysulfone, poly ether sulfone, polyvinyl chloride, or polyacrylonitrile. The copolymer contains zwitterionic repeat units and hydrophobic repeat units, in which the zwitterionic repeat units constitute 2-60% by weight of the copolymer, and the hydrophobic repeat units are capable of forming a homopolymer that is miscible with the base polymer, each of the hydrophobic repeat units being different from a repeat unit of polyvinylidene fluoride. In addition, the copolymer is insoluble in water.

Typically, the zwitterion-containing copolymer used in this method constitutes less than 50 wt % of a mixture of the base polymer and the zwitterion-containing copolymer. The zwitterion-containing copolymer can be a statistical copolymer. The statistical copolymer the zwitterionic repeat units are each formed independently from sulfobetaine methacrylate, sulfobetaine-2-vinyl pyridine, sulfobetaine-4-vinyl pyridine, phosphorylcholine methacrylate, contains zwitterionic repeat units and hydrophobic repeat units, in which the zwitterionic repeat units each can be formed independently from carboxybetaine methacrylate, or sulfobetaine acrylamide; and each of the hydrophobic repeat units, independently, can be [—O-Ph-C(CH$_3$)$_2$-Ph-O-Ph-SO$_2$-Ph-], [-Ph-SO$_2$-Ph-O-Ph-Ph-O—], [-Ph-SO$_2$-Ph-O-Ph-SO$_2$-Ph-O—], [-Ph-SO$_2$-Ph-O-Ph-O—], or a repeat unit formed from methyl methacrylate, N,N-dimethyl acrylamide, ethyl methacrylate, acetonyl methacrylate, trifluoroethyl methacrylate, vinyl pyridine, vinyl chloride, styrene, butyl acrylate, butyl methacrylate, cyclohexyl methacrylate, or propyl acrylate. Again, the statistical copolymer can be PMMA-r-SBMA or PMMA-r-SB2VP.

The zwitterion-containing copolymer can also be a graft copolymer including a hydrophobic backbone, which contains more hydrophobic repeat units than zwitterionic repeat units, and 2-50 repeat side chains, each of which contains more zwitterionic repeat units than hydrophobic repeat units. Again, an example of the graft copolymer is PMMA-g-SB2VP.

The method can further include a step of keeping the filtration membrane thus formed in water at a temperature of 30 to 90° C. (e.g., 50 to 90° C. and 70 to 90° C.) for 10 minutes or longer.

In addition to the copolymer and the base polymer, other additives such as well-known pore formers can be added to the copolymer solution to form a porous membrane.

The hydrophilicity of the zwitterionic repeat units causes them to extend from and cover the surface of the filtration membrane. The skeletal architecture or shape of the copolymer formed from the zwitterionic repeat units results in either only zwitterionic moieties or short chains of zwitterionic repeat units disposed on the surface of the membrane.

Of note, the copolymer used to prepare a filtration membrane requires that the zwitterionic repeat units constitute 2-60% by weight of the copolymer. A filtration membrane formed from such a copolymer is found to have both improved flux and improved fouling resistance. The membrane thus formed has the copolymer present on its surface, in which the copolymer can be detected by attenuated total reflection fourier transform infared (ATR-FTIR) spectroscopy. On the other hand, a high content of zwitterionic repeat units (e.g., >60 wt %) causes the copolymer to separate from the base polymer and, as such, leads to low compatibility and poor membrane performance. A filtration membrane formed from this type of copolymer often has zwitterionic repeat units trapped below the membrane surface and the copolymer embedded into the membrane, in which the copolymer cannot be detected by ATR-FTIR spectroscopy.

The filtration membrane prepared according to the method set forth above can be a flat sheet membrane or a hollow fiber membrane. To prepare a flat sheet membrane, the polymer solution containing the base polymer and the copolymer can be first spread on a flat surface, subsequently, the coated flat surface is immersed in an aqueous bath. To prepare a hollow fiber membrane, the polymer solution can be extruded into a hollow tubular shape through a spinneret and the hollow tubular shape thus treated is then immersed in an aqueous bath.

The above-described method for preparing a filtration membrane can be used to prepare both an ultrafiltration membrane and a microfiltration membrane. An ultrafiltration membrane has a molecular weight cut-off of 1000 to 250,000 Dalton (e.g., 5000 to 200,000 Dalton and 10,000 to 100,000 Dalton). It contains effective pores (i.e., channels that allow molecules or particles to pass through) formed by self-assembly of the zwitterionic repeat units and having an effective pore size (i.e., the minimum size of molecules or particles rejected by a membrane) of 1 to 10 nm (e.g., 1-6 nm, 1.5-4.5 nm, and 1.5-3 nm). A microfiltration membrane, on the other hand, contains effective pores having an effective pore size of 20 to 5000 nm (e.g., 50 to 2000 nm and 100 to 1000 nm).

Filtration membranes thus prepared demonstrate higher permeability (i.e., higher flux) and higher fouling resistance, compared with those prepared without using a zwitterionic copolymer. They can be used in various applications including, among others, wastewater treating, pharmaceutical manufacturing, and food processing.

Without further elaboration, it is believed that one skilled in the art can, based on the description herein, utilize the present invention to its fullest extent. The specific examples below are to be construed as merely illustrative, and not limitative of the remainder of the disclosure in any way whatsoever. All publications cited herein are incorporated by reference in their entirety.

In the examples below, random zwitterionic copolymers refer to statistical copolymers and comb-shaped zwitterionic copolymers refer to graft copolymers.

Example 1. Synthesis of Amphiphilic Random and Comb-Shaped Zwitterionic Copolymers Random or comb-shaped zwitterionic copolymers, which contain a hydrophobic backbone, i.e., poly(methyl methacrylate) (PMMA) or poly(trifluoro ethyl methacrylate) (PTFEMA), and zwitterionic, hydrophilic side-chains made of sulfobetaine methacrylate (SBMA) or sulfobetaine-2-vinylpyridine (SB2VP) repeat units, were synthesized following the procedures described below.

Selection of Backbone and Zwitterionic Moieties

In syntheses of both random and comb-shaped copolymers, PMMA was used as a backbone material for being miscible with poly(vinylidene fluoride) (PVDF), a commonly used material in manufacturing ultrafiltration membranes. Random copolymers of PMMA can be synthesized in a single step using well-known free radical polymerization procedures.

Syntheses of the copolymers employed two zwitterionic monomers, i.e., SBMA and SB2VP.

Synthesis of Random Zwitterionic Copolymers

Scheme 1 below shows the synthesis of two random copolymers using two zwitterrionic monomers, i.e., SBMA and SB2VP.

Scheme 1. Synthesis of zwitterionic random copolymers
(a) PMMA-r-SBMA and (b) PMMA-r-SB2VP

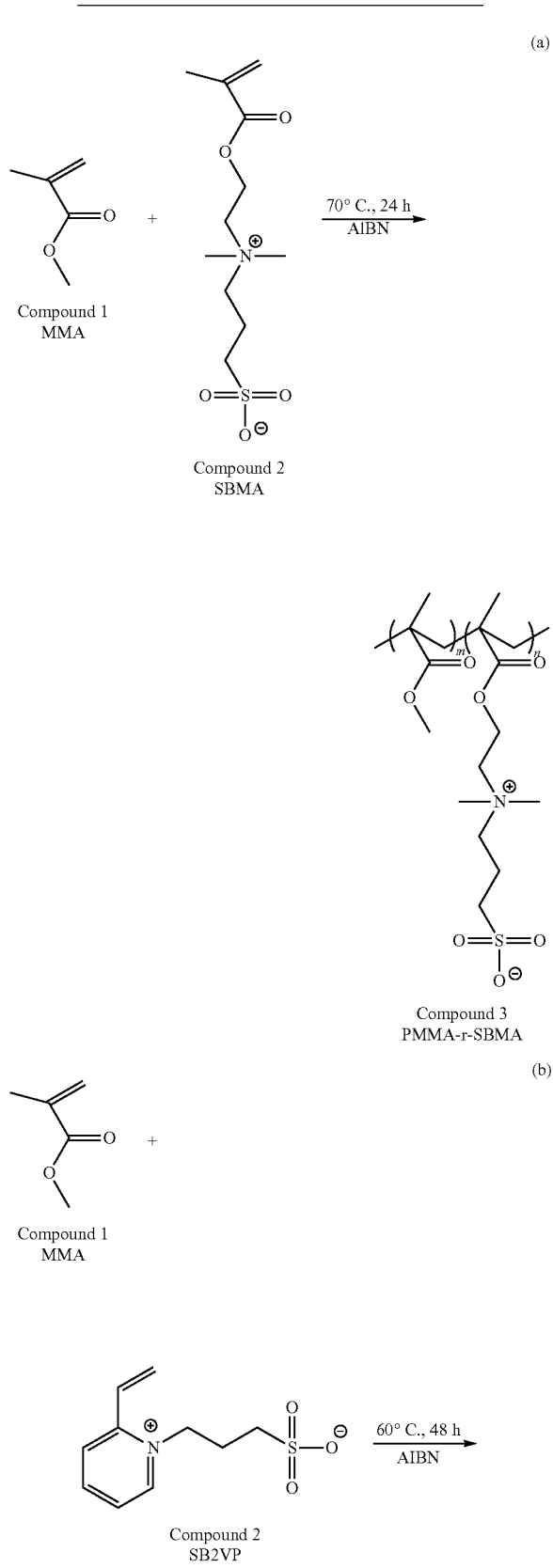

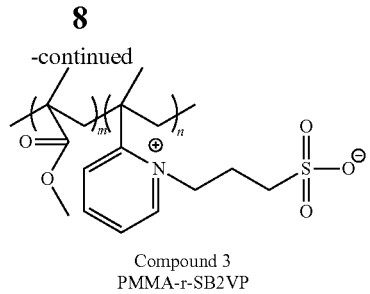

Compound 3
PMMA-r-SB2VP

Two random copolymers containing a PMMA backbone and zwitterionic SBMA or SB2VP side chains were synthesized by free radical polymerization (FRP) as follows.

SBMA was purchased commercially and used directly. SB2VP was synthesized following the procedure reported in Purdy et al., *Polymer Preprints* 2009, 50 (2), 677. To synthesize the random copolymer PMMA-r-SBMA (see Scheme 1a, supra), 24 g (25.81 mL) of methyl methacrylate (MMA) was dissolved in 70 mL of dimethyl sulfoxide (DMSO) at room temperature, and 6 g of SBMA was initially dissolved in 120 mL of DMSO at 60° C. and then cooled to room temperature. These solvated monomers were mixed (MMA:SBMA feeding ratio=80:20 wt %) in a 500 mL round bottom flask, followed by the addition of azobisisobutyronitrile (AIBN; 0.03 g). After all solid materials were fully dissolved, the reaction mixture was purged with nitrogen for at least 30 minutes and then stirred at 320 rpm for 24 hours at 70° C. Subsequently, the reaction mixture was exposed to air and added 1.5 g of monomethyl ether of hydroquinone (MEHQ) to terminate the reaction. It was precipitated into a 1:1 mixture of hexane and ethanol, followed by three washes with methanol for removing any residual monomers. The white solid polymer thus obtained was dried for two days in a fume hood and two more days in a vacuum oven at 50° C. to afford copolymer PMMA-r-SBMA, which was characterized by $^1$H NMR (DMSO-d6). The NMR spectrum indicated that the copolymer had an MMA:SBMA ratio of 81:19 wt %.

The other random copolymer PMMA-r-SB2VP (see Scheme 1b, supra) was synthesized following the procedure set forth above. More specifically, 25.5 g (27.42 mL) of MMA was dissolved in 70 mL of trifluoroethanol (TFE) at room temperature, and 4.5 g of SB2VP was separately dissolved in 40 mL of TFE also at room temperature. The monomer solutions were mixed (MMA:SB2VP ratio=85:15 wt %) in a 250 mL round bottom flask and 0.03 g of AIBN was added. After all solid materials were fully dissolved, the reaction mixture was purged with nitrogen for at least 30 minutes. The reaction was stirred at 320 rpm for 48 hours at 60° C. Subsequently, the reaction mixture was exposed to air and added 1.5 g of MEHQ to terminate the reaction. It was precipitated into a 1:1 mixture of hexane and ethanol, followed by three washes with methanol for removing any residual monomers. The pinkish solid polymer thus obtained was dried for two days in a fume hood and two more days in a vacuum oven at 50° C. to afford copolymer PMMA-r-SB2VP, which was characterized by $^1$H NMR (DMSO-d6). The NMR spectrum indicated that the copolymer had an MMA:SB2VP ratio of 82:18 wt %.

Both of these zwitterionic random copolymers were used in preparing filtration membranes.

Synthesis of Comb-Shaped Zwitterionic Copolymer

Scheme 2 below shows the synthesis of a graft copolymers via free radical polymerization (FRP) and atom transfer radical polymerization (ATRP).

Scheme 2. Synthesis of zwitterionic comb-shaped copolymer PMMA-g-SB2VP

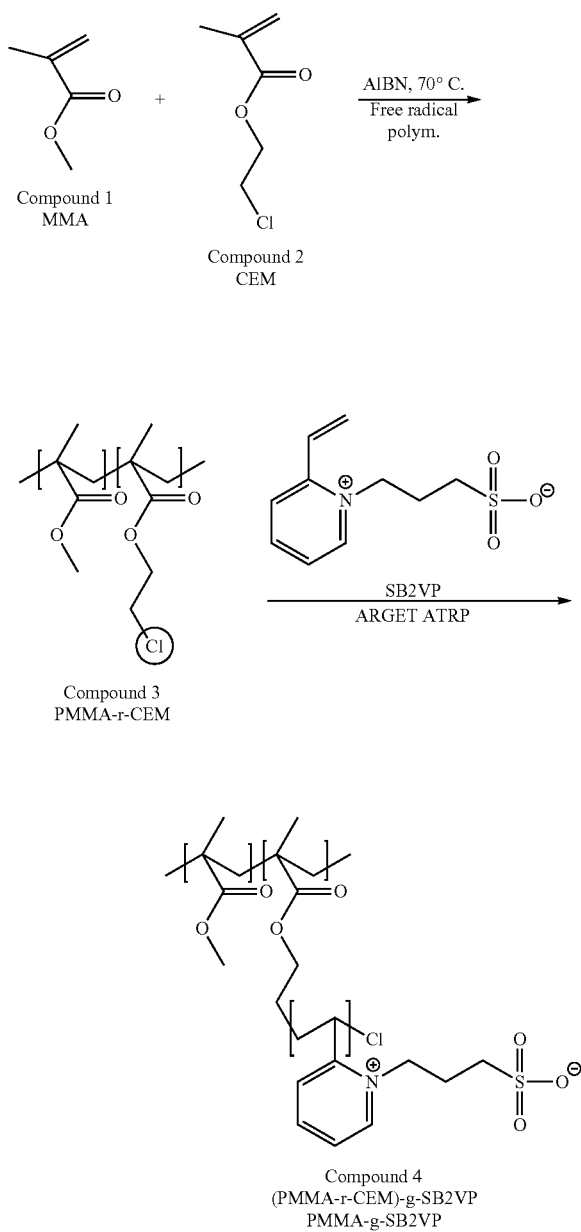

Compound 4
(PMMA-r-CEM)-g-SB2VP
PMMA-g-SB2VP

A graft copolymer containing a PMMA backbone and zwitterionic SB2VP side chains was synthesized via a two-step sequence as follows.

First, a PMMA-based backbone interspersed with chlorine atoms was formed by free radical polymerization. These chlorine atoms were provided by the monomer 2-chloroethyl methacrylate (CEM). Second, zwitterionic side chains were installed at the positions where the chlorine atoms were by an activator regenerated by electron transfer for atom transfer radical polymerization (ARGET ATRP), which is a polymerization method that is initiated at Cl (or Br) atoms and catalyzed by copper complexes. The zwitterionic comb-shaped copolymer thus prepared contained a PMMA-r-CEM backbone and zwitterionic SB2VP side chains.

The polymer backbone PMMA-r-CEM was synthesized following a standard free radical polymerization. More specifically, 32 g (34.4 mL) of MMA was dissolved in 100 mL of DMSO at room temperature to form a solution, and 1.9 g (1.31 mL) of CEM was separately dissolved in 30 mL of DMSO at room temperature to afford another solution. The monomer solutions were mixed (MMA:CEM ratio=25:1 mol %) in a 250 ml round bottom flask and 0.034 g of AIBN was added. The reaction mixture thus formed was purged with nitrogen for at least 30 minutes and stirred at 320 rpm for 24 hours at 70° C. The reaction was stopped by exposing it to air and addition of 1.7 g MEHQ. Subsequently, the reaction mixture was precipitated into a 1:1 mixture of hexane and ethanol, followed by three washes with ethanol for removing any residual monomers. The white solid polymer thus obtained was dried for two days in a fume hood and two more days in a vacuum oven at 50° C. to afford polymer backbone PMMA-r-CEM, which was characterized by $^1$H NMR (DMSO-d6).

The NMR spectrum indicated that the polymer backbone had an MMA:CEM ratio of 21:1 mol %.

An ARGET ATRP procedure was followed to synthesize graft copolymer PMMA-g-SB2VP (see Scheme 2, supra). More specifically, the polymer backbone PMMA-r-CEM and zwitterion-containing monomer SB2VP were dissolved in DMSO in separate round bottom flasks to afford two solutions. The amounts of materials used in this experiment are shown in Table 1 below. The PMMA-r-CEM solution was prepared to make a 10% solution (by wt), and the SB2VP solution was prepared at 70° C. to make a 3-3.5% solution (by wt). The two solutions were mixed in a 1 L round bottom flask, and after dissolving completely, the mixture thus obtained was purged with nitrogen for at least 1 hour. In another 1 L round bottom flask, copper(II)chloride (CuCl$_2$), N,N,N',N',N"-pentamethyldiethylenetriamine (PMDETA) and ascorbic acid (AsAc) were mixed, followed by prompt addition of the monomer mixture. The material-containing flask was sealed and placed in a pre-heated oil bath set at the desired reaction temperature with stirring at 360 rpm. The headspace was purged with nitrogen for 20 minutes, and the reaction was allowed to run for a desired reaction time. The polymerization reaction was stopped by cooling, exposure to air, and addition of MEHQ (5% by wt of the total monomer mass). The reaction mixture was then precipitated into a 1:1 mixture of hexane and ethanol, and filtered to collect a solid. The solid thus obtained was re-dissolved in trifluoroethanol (TFE) and precipitated into de-ionized water to remove any residual SB2VP monomers. This purification procedure was repeated three times. After filtration, the solid thus collected was dried for two days in a fume hood and two more days in a vacuum oven at 50° C. to provide the graft copolymer PMMA-g-SB2VP, which was characterized by $^1$H NMR (DMSO-d6). The copolymer composition and side-chain length were determined by the NMR spectrum. The ratio of the peaks on the NMR spectrum along with the polymer backbone PMMA-r-CEM composition (MMA:CEM ratio=21:1) was used to calculate the graft copolymer composition. Table 1 shows the compositions of the reaction mixtures and the graft copolymer, which was encoded as PMMA-g-SB2VP3 based on its side-chain length.

TABLE 1

Reaction mixture and product comb copolymer composition in ARGET ATRP

| Polymer code | Reaction mixture composition | | | | | | | Copolymer composition (PMMA-r- | |
|---|---|---|---|---|---|---|---|---|---|
| | PMMA-r-CEM backbone | SB2VP | PMDETA | Cu(II)Cl | AsAc | Reaction. time | Reaction. temp. | CEM):SB2VP weight ratio | Cl:SB2VP mole ratio |
| PMMA-g-SB2VP3 | 5 g | 18.2 g | 4.2 g | 1.08 g | 14.1 g | 30 h | 150° C. | 79:21 | 1:3 |

Example 2. Preparation of Filtration Membranes Containing Random or Comb-Shaped Zwitterionic Copolymers Preparation of Filtration Membranes Containing Random Zwitterionic Copolymers Ultrafiltration membranes were casted from a blend of based polymer polyvinylidene fluoride (PVDF; Arkema Inc.) and random copolymer PMMA-r-SBMA or PMMA-r-SB2VP obtained in Example 1 by non-solvent induced phase separation (NIPS) as below.

More specifically, the random copolymer was dissolved in DMSO at approximately 70° C. to form a copolymer solution. Subsequently, PVDF was added into the copolymer solution. The resulting mixture was stirred at 70° C. overnight to afford a casting solution. The casting solution was degassed in a vacuum oven at 50° C. for at least 24 hours. A filtration membrane was formed by casting a film of the mixed polymer solution using a doctor blade with 150 micrometer gate. Following casting, the membrane was immersed in a water bath for 20 minutes to precipitate out the polymer blend. Three casting solutions were formed to prepare three filtration membranes. Each of the three cast solutions was formed in 17 g of DMSO with 3 g of polymer blend having a random copolymer:PVDF ratio of 5:95%, 10:90%, or 15:85% in weight percentage.

As a control, a sole PVDF membrane was prepared by dissolving 3 g PVDF in 17 g DMSO and following the NIPS procedure described above.

All of the filtration membranes thus prepared were encoded as shown in Table 2 below.

TABLE 2

Codes and contents of filtration membranes with random zwitterionic copolymer

| Membrane code | Copolymer | PVDF:Copolymer ratio (wt %) |
|---|---|---|
| PVDF | None | 100:0 |
| 5PMMA-r-SBMA | PMMA-r-SBMA | 95:5 |
| 10PMMA-r-SBMA | PMMA-r-SBMA | 90:10 |
| 15PMMA-r-SBMA | PMMA-r-SBMA | 85:15 |
| 5PMMA-r-SB2VP | PMMA-r-SB2VP | 95:5 |
| 10PMMA-r-SB2VP | PMMA-r-SB2VP | 90:10 |
| 15PMMA-r-SB2VP | PMMA-r-SB2VP | 85:15 |

Membrane morphology was determined by the examination of freeze-fractured cross-sections of the membranes using a scanning electron microscope (SEM, Phenom G2 Pure Tabletop SEM). SEM images indicated that, unexpectedly, all of the filtration membranes containing a random copolymer were highly porous and the observed pore sizes increased with a higher copolymer content.

Preparation of Filtration Membranes Containing Comb-Shaped Zwitterionic Copolymer Ultrafiltration membranes were casted from a blend of based polymer PVDF (obtained from Arkema Inc.) and the graft copolymer PMMA-g-SB2VP3 set forth above by non-solvent induced phase separation (NIPS) as follows.

More specifically, the graft copolymer was dissolved in DMSO at approximately 70° C. to form a copolymer solution. Subsequently, PVDF was added into the copolymer solution. The resulting mixture was stirred at 70° C. overnight to afford a casting solution. The casting solution was degassed in a vacuum oven at 50° C. for at least 24 hours. A filtration membrane was formed by casting a film of the mixed polymer solution using a doctor blade with 150 micrometer gate. Following casting, the membrane was immersed in a water bath for 20 minutes to precipitate out the polymer blend. Three casting solutions were formed to prepare three filtration membranes. Each of the three cast solutions was formed in 17 g of DMSO with 3 g of polymer blend having a graft copolymer:PVDF ratio of 5:95%, 10:90%, or 15:85% in weight percentage.

Again, as a control, a sole PVDF membrane was prepared by dissolving 3 g PVDF in 17 g DMSO and following the NIPS procedure described above.

All of the filtration membranes containing a graft copolymer thus prepared were encoded as shown in Table 3 below.

TABLE 3

Codes and contents of filtration membranes with comb-shaped zwitterionic copolymer additive

| Membrane code | Copolymer | PVDF:Copolymer ratio (% wt) |
|---|---|---|
| 5PMMA-g-SB2VP3 | PMMA-g-SB2VP3 | 95:5 |
| 10PMMA-g-SB2VP3 | PMMA-g-SB2VP3 | 90:10 |
| 15PMMA-g-SB2VP3 | PMMA-g-SB2VP3 | 85:15 |

SEM images indicated that, unexpectedly, all of the filtration membranes containing a graft copolymer were highly porous and the observed pore sizes increased with a higher copolymer content.

Example 3. Miscibility Between PVDF and Comb-Shaped Zwitterionic Copolymers by Differential Scanning Calorimetry (DSC)

A study was performed to evaluate the miscibility between base polymer PVDF and graft zwitterionic copolymers as follows.

DSC was used to confirm that the graft zwitterionic copolymer PMMA-g-SB2VP3 is miscible with PVDF. Glass transition temperature (Tg) of blends of PVDF with graft zwitterionic copolymers was measured. Increase of the PVDF Tg with increasing of the copolymer content was used to confirm miscibility between the copolymer and PVDF.

Samples with mass of about 8 mg were encapsulated in Aluminum pans and heated in a TA Instruments Q100 DSC, which was purged with dry nitrogen gas at a flow rate of 50 mL/min. Measurements were conducted in a temperature-modulated differential scanning calorimetry (TMDSC) mode. The samples were heated at 1° C./min with a modulation period of 40 s and a temperature amplitude of ±0.106° C. TMDSC endotherms were recored and Tg values obtained from each endotherm are shown in Table 4 below.

It was observed that glass transition temperatures of all of the membranes containing a graft copolymer, unexpectedly, were higher than the PVDF Tg and increased with increasing of the graft copolymer content.

These results confirmed that the graft copolymer was miscible with PVDF.

TABLE 4

Glass transition temperatures of membranes PVDF, 5PMMA-g-SB2VP3, 10PMMA-g-SB2VP3, and 15PMMA-g-SB2VP3

| Membrane code | Tg (° C.) |
| --- | --- |
| PVDF | −57.8 |
| 5PMMA-g-SB2VP3 | −51.2 |
| 10PMMA-g-SB2VP3 | −49.5 |
| 15PMMA-g-SB2VP3 | −47.9 |

Example 4. Surface Analysis by ATR-FTIR of Filtration Membranes Containing Random or Comb-Shaped Zwitterionic Copolymers A study was performed to analyze membrane surface using attenuated total reflection fourier transform infared (ATR-FTIR) spectroscopy as follows.

ATR-FTIR spectroscopy was used to confirm that both random and graft zwitterionic copolymers mix well with the PVDF base polymer and that they are present on the surface of filtration membranes. The infrared spectra were recorded using a Jasco FTIR-6200 Spectrometer (Jasco Instruments, Tokyo, Japan), equipped with a deuterated triglycine sulfate detector and a multiple-reflection, horizontal MIRacle ATR accessory. The spectra were analyzed using the instrument's SpectraManager software in absorption mode at 4 cm$^{-1}$ resolution with 256 scans between 2000-600 cm$^{-1}$. Background absorption was subtracted from the sample spectra to establish baseline.

ATR-FTIR spectra obtained from filtration membranes with PMMA-r-SBMA, PMMA-r-SB2VP, and PMMA-g-SB2VP3 were recored.

It was observed that, in membranes prepared with both random and comb copolymer additive, the intensity increase in the fingerprint O—C=O ester carbonyl stretch at 1740 cm$^{-1}$ was unexpectedly proportional to the increase of zwitterionic copolymer content.

This result confirmed that zwitterionic components were present on the membrane surface, and that both random and graft zwitterionic copolymers were miscible with the PVDF base polymer.

Example 5. Surface Hydrophilicity of Filtration Membranes Containing Random or Comb-Shaped Zwitterionic Copolymers A study was performed to analyze surface hydrophilicity or wettability of filtration membranes as follows.

The wettability of filtration membranes with random and comb-shaped zwitterionic copolymers, i.e., PMMA-r-SBMA, PMMA-r-SB2VP and PMMA-g-SB2VP3, was evaluated by measuring water contact angle (CA). A ramehart contact angle instrument equipped with a horizontal microscope and a camera connected to a video screen was used for measurements. The membranes were dried for 24 hours at room temperature prior to the measurements. Each water droplet had a volume of 2 µL, and its contact angle was calculated right after dispensing the droplet using the droplet screen image. The measurements were repeated using different areas of each of the membranes. For each measurement recorded, the contact angles of at least five water droplets were used.

The average contact angle of all filtration membranes, either with a random or comb-shaped copolymer, was unexpectedly found to be 75±5° within error limits, whereas the PVDF membrane had a contact angle of about 99°.

These results showed that the filtration membranes of this invention had increased hydrophilicity, compared with the PVDF membrane.

Example 6. Ionic Strength of Filtration Membranes Containing a Comb-Shaped Zwitterionic Copolymer The presence of ions (i.e., changes in ionic strength) in a liquid strongly influences how zwitterions interact with each other and with water molecules. This makes zwitterion-containing filtration membranes responsive to ionic strength. See Bredas et al., *Macromolecules* 1988, 21 (6), 1633-1639; Azzaroni et al., *Angewandte Chemie* 2006, 118 (11), 1802-1806; and Georgiev et al., *Biomacromolecules* 2006, 7 (4), 1329-1334.

A study was performed to analyze impact of ionic strength on the filtration membranes containing a graft copolymer, i.e., 5PMMA-g-SB2VP3, 10PMMA-g-SB2VP3, and 15PMMA-g-SB2VP3, as follows.

Filtering salt solutions with a range of ionic strengths was performed to determine whether interaction of zwitterionic side chains with salt ions in an aqueous feed changes surface segregation of the membranes containing zwitterionic copolymers and, thus, affects their permeability. The permeability of filtration membranes containing zwitterionic comb-shaped copolymer PMMA-g-SB2VP3 was measured with salt solution at different sodium chloride (NaCl) concentrations.

It was observed that water permeability decreased with increasing ionic strength, indicating that zwitterionic side chains could be expanding out from the pore walls toward the pore center and thus, decreasing effective pore diameter.

Example 7. Water Permeability, Fouling Resistance, and Protein Rejection of Filtration Membranes Containing Random and Comb-Shaped Zwitterionic Copolymers A study was performed to evaluate water permeability, fouling resistance, and protein rejection of filtration membranes as follows.

The study was conducted to assess filtration membranes with random and comb-shaped zwitterionic copolymers, i.e., PMMA-r-SBMA, PMMA-r-SB2VP, and PMMA-g-SB2VP3.

Prior to permeability tests, the membranes were allowed to stabilize by passing deionized (DI) water through at least overnight under a pressure of 30 psi (0.21 MPa). All permeability tests were conducted with an Amicon 8010 stirred, dead-end filtration cell (Millipore) with a cell volume of 10 mL and an effective filtration area of 4.1 cm$^2$, attached to a 3.5-L dispensing vessel. The cell was stirred at 500 rpm using a stir plate under a pressure of 10 psi (0.07 MPa). A Scout Pro SP401 balance connected to a Dell laptop was used to automatically measure the permeate weight every 30 seconds using TWedge 2.4 software (TEC-IT, Austria). The permeate flow occured one droplet at a time. The measured volume at each data point varied by 1-2 droplets amounting to 0.05-0.1 ml.

In testing fouling resistance, a model foulant solution was prepared with 1 g/L bovine serum albumin (BSA, 66.5 kDa) in phosphate buffer saline (PBS, pH 7.4). The water permeability, BSA rejection, and fouling resistance were tested in series, following the following steps: (1) filtering DI water to determine an initial flux, (2) filtering phosphate buffer saline (PBS) solution, (3) filtering bovine serum albumin (BSA, 66.5 kDa) foulant solution to simulate protein fouling, (4) filtering phosphate buffer saline (PBS) solution, and (5) filtering DI water again to compare fluxes before and after fouling. Protein concentration in feed and permeate was quantified by measuring the UV absorbance at 280 nm utilizing a Thermo Scientific Genesys 10S UV-Vis spectrophotometer equipped with a high-intensity xenon lamp and dual-beam optical geometry.

Results shown in Table 5 below were obtained from the study of filtration membranes containing random zwitterionic copolymers, i.e., PMMA-r-SBMA and PMMA-r-SB2VP.

TABLE 5

Water permeability and percentage BSA rejection of filtration membranes with random zwitterionic copolymers after 2-hour BSA fouling

| Membrane code | Initial water flux (L/m$^2$ · h · bar) | Water flux after BSA fouling (L/m$^2$ · h · bar) | BSA rejection (%) |
|---|---|---|---|
| PVDF | 19.1 | 17.3 ± 1.2 | 98.8 |
| 5PMMA-r-SBMA | 38.2 ± 0.8 | 39.6 ± 0.9 | 98.6 |
| 10PMMA-r-SBMA | 127.9 ± 1 | 125.4 ± 0.6 | 97.4 |
| 15PMMA-r-SBMA | 163.3 ± 0.6 | not available | not available |
| 5PMMA-r-SB2VP | 43.9 ± 1 | 45.2 ± 0.8 | 98.3 |
| 10PMMA-r-SB2VP | 84.2 ± 1 | 82.9 ± 0.6 | 98.6 |
| 15PMMA-r-SB2VP | 168.7 ± 1.1 | 129.3 ± 4.5 | 98.2 |

Unexpectedly, after 2 h BSA fouling, membranes containing a 5% copolymer content of either PMMA-r-SBMA or PMMA-r-SB2VP showed high resistance against BSA fouling and permeability 2 to 3-fold that of the PVDF membrane; membranes containing a 10% copolymer content of either PMMA-r-SBMA or PMMA-r-SB2VP showed high resistance against BSA fouling and permeability 5 to 7-fold that of the PVDF membrane; and membrane 15PMMA-r-SB2VP showed high resistance against BSA fouling and permeability as high as 7-fold that of the PVDF membrane after 2 h BSA fouling.

Results shown in Table 6 below were obtained from the study of filtration membranes containing graft zwitterionic copolymers, i.e., PMMA-g-SB2VP3.

TABLE 6

Water permeability and percentage BSA rejection of filtration membranes with graft zwitterionic copolymers after 2-hour BSA fouling

| Membrane code | Initial water flux (L/m$^2$ · h · bar) | Water flux after BSA fouling (L/m$^2$ · h · bar) | BSA rejection (%) |
|---|---|---|---|
| PVDF | 19.1 | 17.3 ± 1.2 | 98.8 |
| 5PMMA-g-SB2VP3 | 114.6 ± 0.9 | 114.4 ± 0.6 | 98 |
| 10PMMA-g-SB2VP3 | 147.5 ± 1.4 | 143.3 ± 1.1 | 95.3 |
| 15PMMA-g-SB2VP3 | 204.3 ± 1 | 202 ± 2 | 78.9 |

Unexpectedly, all filtration membranes containing graft copolymer PMMA-g-SB2VP3 showed high resistance against BSA fouling and permeability 7 to 12-fold that of the PVDF membrane after 2-hour BSA fouling.

In addition, all filtration membranes containing graft copolymers showed significantly higher permeability compared to their counterparts containing random copolymers, demonstrating unexpected superior performance of filtration membranes containing graft copolymers.

These results indicated that the filtration membranes of this invention had high permeability (i.e., water flux) and high fouling resistance.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Indeed, to achieve the purpose of purification and separation, one skilled in the art can design a membrane that contains any combination of zwitterionic repeat units and hydrophobic repeat units. Further, the ratios and molecular weights of these repeat units can be so engineered to achieve separation of molecules of different molecular weights.

From the above description, a skilled artisan can easily ascertain the essential characteristics of the present invention, and without departing from the spirit and scope thereof, can make various changes and modifications of the invention to adapt it to various usages and conditions. Thus, other embodiments are also within the claims.

What is claimed is:
1. A graft copolymer, comprising:
   a hydrophobic backbone, comprising a plurality of hydrophobic repeat units and a plurality of zwitterionic repeat units, wherein the number of hydrophobic repeat units is greater than the number of zwitterionic repeat units; and
   a plurality of 2-50 repeat side chains, comprising hydrophobic repeat units and zwitterionic repeat units, wherein each side chain comprises more zwitterionic repeat units than hydrophobic repeat units;
   wherein
   the zwitterionic repeat units constitute 2-60% by weight of the graft copolymer;
   each of the hydrophobic repeat units, independently, is [—O-Ph-C(CH$_3$)$_2$-Ph-O-Ph-SO$_2$-Ph-], [-Ph-SO$_2$Ph-O-Ph-Ph-O—], [-Ph-SO$_2$-Ph-O-Ph-SO$_2$-Ph-O—], [-Ph-SO$_2$-Ph-O-Ph-O—], or a repeat unit formed from methyl methacrylate, N,N-dimethyl acrylamide, ethyl methacrylate, acetonyl methacrylate, trifluoroethyl methacrylate, acrylonitrile, vinyl pyridine, vinyl chloride, styrene, cyclohexyl methacrylate, or propyl acrylate;

the hydrophobic repeat units are capable of forming a homopolymer that is miscible with polyvinylidene fluoride, polysulfone, poly ether sulfone, polyvinyl chloride, or polyacrylonitrile; and each of the hydrophobic repeat units being different from a repeat unit formed from vinylidene fluoride.

2. The graft copolymer of claim 1, wherein the zwitterionic repeat units each comprise independently sulfobetaine, carboxybetaine, phosphorylcholine, or pyridinium alkyl sulfonate; and each of the hydrophobic repeat units, independently, is formed from methyl methacrylate, N,N-dimethyl acrylamide, ethyl methacrylate, acetonyl methacrylate, trifluoroethyl methacrylate, acrylonitrile, vinyl pyridine, vinyl chloride, styrene, cyclohexyl methacrylate, or propyl acrylate.

3. The graft copolymer of claim 2, wherein the zwitterionic repeat units constitute 5-45% by weight of the graft copolymer and the graft copolymer has a molecular weight of 10,000 to 3,000,000 Dalton.

4. The graft copolymer of claim 3, wherein the zwitterionic repeat units constitute 10-30% by weight of the graft copolymer and the graft copolymer has a molecular weight of 30,000 to 1,000,000 Dalton.

5. The graft copolymer of claim 2, wherein the zwitterionic repeat units are each formed independently from sulfobetaine methacrylate, sulfobetaine-2-vinyl pyridine, sulfobetaine-4-vinyl pyridine, phosphorylcholine methacrylate, carboxybetaine methacrylate, or sulfobetaine acrylamide; and the hydrophobic repeat units are each formed from methyl methacrylate.

6. The graft copolymer of claim 5, wherein the zwitterionic repeat units constitute 5-45% by weight of the graft copolymer and the graft copolymer has a molecular weight of 10,000 to 3,000,000 Dalton.

7. The graft copolymer of claim 2, wherein the zwitterionic repeat units are each formed independently from sulfobetaine methacrylate, sulfobetaine-2-vinyl pyridine, sulfobetaine-4-vinyl pyridine, phosphorylcholine methacrylate, carboxybetaine methacrylate, or sulfobetaine acrylamide.

8. The graft copolymer of claim 7, wherein the zwitterionic repeat units are each formed from sulfobetaine methacrylate.

9. The graft copolymer of claim 8, wherein the hydrophobic repeat units are each formed from methyl methacrylate.

10. The graft copolymer of claim 7, wherein the zwitterionic repeat units are each formed from sulfobetaine-2-vinyl pyridine.

11. The graft copolymer of claim 10, wherein the hydrophobic repeat units are each formed from methyl methacrylate.

12. The graft copolymer of claim 7, wherein the zwitterionic repeat units are each formed from sulfobetaine-4-vinyl pyridine.

13. The graft copolymer of claim 12, wherein the hydrophobic repeat units are each formed from methyl methacrylate.

14. The graft copolymer of claim 7, wherein the zwitterionic repeat units are each formed from phosphorylcholine methacrylate.

15. The graft copolymer of claim 14, wherein the hydrophobic repeat units are each formed from methyl methacrylate.

16. The graft copolymer of claim 7, wherein the zwitterionic repeat units are each formed from carboxybetaine methacrylate.

17. The graft copolymer of claim 16, wherein the hydrophobic repeat units are each formed from methyl methacrylate.

18. The graft copolymer of claim 7, wherein the zwitterionic repeat units are each formed from sulfobetaine acrylamide.

19. The graft copolymer of claim 18, wherein the hydrophobic repeat units are each formed from methyl methacrylate.

20. The graft copolymer of claim 1, wherein the zwitterionic repeat units constitute 5-45% by weight of the graft copolymer and the graft copolymer has a molecular weight of 10,000 to 3,000,000 Dalton.

21. The graft copolymer of claim 20, wherein the zwitterionic repeat units constitute 10-30% by weight of the graft copolymer and the graft copolymer has a molecular weight of 30,000 to 1,000,000 Dalton.

22. A filtration membrane comprising:

a base polymer, and a zwitterion-containing copolymer, wherein the base polymer is polyvinylidene fluoride, polysulfone, poly ether sulfone, polyvinyl chloride, or polyacrylonitrile;

the zwitterion-containing copolymer comprises zwitterionic repeat units and hydrophobic repeat units, in which the zwitterionic repeat units constitute 2-60% by weight of the copolymer and the hydrophobic repeat units are capable of forming a homopolymer that is miscible with the base polymer, each of the hydrophobic repeat units being different from a repeat unit of polyvinylidene fluoride; and the zwitterion-containing copolymer is insoluble in water, wherein the zwitterion-containing copolymer is a graft copolymer including a hydrophobic backbone, comprising a plurality of hydrophobic repeat units and a plurality of zwitterionic repeat units, wherein the number of hydrophobic repeat units is greater than the number of zwitterionic repeat units, and a plurality of 2-50 repeat side chains, each of which comprises more zwitterionic repeat units than hydrophobic units; wherein the zwitterionic repeat units constitute 2-60% by weight of the graft copolymer;

the zwitterionic repeat units each comprises independently sulfobetaine, carboxybetaine, phosphorylcholine, or pyridinium alkyl sulfonate;

each of the hydrophobic repeat units, independently, is [—O-Ph-C(CH$_3$)$_2$-Ph-O-Ph-SO$_2$-Ph-], [-Ph-SO$_2$Ph-O-Ph-Ph-O—], [-Ph-SO$_2$-Ph-O-Ph-SO$_2$-Ph-O—], [-Ph-SO$_2$-Ph-O-Ph-O—], or a repeat unit formed from methyl methacrylate, N,N-dimethyl acrylamide, ethyl methacrylate, acetonyl methacrylate, trifluoroethyl methacrylate, acrylonitrile, vinyl pyridine, vinyl chloride, styrene, cyclohexyl methacrylate, or propyl acrylate;

the hydrophobic repeat units are capable of forming a homopolymer that is miscible with polyvinylidene fluoride, polysulfone, poly ether sulfone, polyvinyl chloride, or polyacrylonitrile; and each of the hydrophobic repeat units being different from a repeat unit formed from vinylidene fluoride.

23. The filtration membrane of claim 22, wherein the membrane is an ultrafiltration membrane or a microfiltration membrane.

24. The filtration membrane of claim 22, wherein each of the hydrophobic repeat units is different from a repeat unit of polyacrylonitrile; and the zwitterion-containing copolymer constitutes less than 50 wt % of a mixture of the base polymer and the zwitterion-containing copolymer.

25. The filtration membrane of claim 22, wherein the zwitterionic repeat units are each formed independently from sulfobetaine methacrylate, sulfobetaine-2-vinyl pyridine, sulfobetaine-4-vinyl pyridine, phosphorylcholine methacrylate, carboxybetaine methacrylate, or sulfobetaine acrylamide; and each of the hydrophobic repeat units, independently, is formed from methyl methacrylate, N,N-dimethyl acrylamide, ethyl methacrylate, acetonyl methacrylate, trifluoroethyl methacrylate, acrylonitrile, vinyl pyridine, vinyl chloride, styrene, cyclohexyl methacrylate, or propyl acrylate.

26. The filtration membrane of claim 22, wherein the zwitterionic repeat units constitute 5-45% by weight of the graft copolymer and the graft copolymer has a molecular weight of 10,000 to 3,000,000 Dalton.

27. The filtration membrane of claim 22, wherein the membrane is a flat sheet membrane or a hollow fiber membrane.

* * * * *

UNITED STATES PATENT AND TRADEMARK OFFICE
CERTIFICATE OF CORRECTION

PATENT NO. : 10,525,424 B2
APPLICATION NO. : 15/541260
DATED : January 7, 2020
INVENTOR(S) : Ayse A. Alexiou et al.

Page 1 of 1

It is certified that error appears in the above-identified patent and that said Letters Patent is hereby corrected as shown below:

On the Title Page

In the field of "Inventors":
Please replace:
"Chiara Vanucci"
With:
--Chiara Vannucci--.

Signed and Sealed this
Eleventh Day of February, 2020

Andrei Iancu
*Director of the United States Patent and Trademark Office*